United States Patent
Cho et al.

(10) Patent No.: US 10,184,533 B2
(45) Date of Patent: Jan. 22, 2019

(54) CONTROL METHOD FOR VEHICLE WITH DCT

(71) Applicant: Hyundai Motor Company, Seoul (KR)

(72) Inventors: Sung Hyun Cho, Yongin-si (KR); Ho Sung Kim, Hwaseong-si (KR); Young Min Yoon, Suwon-si (KR); Seong Hwan Cheong, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 252 days.

(21) Appl. No.: 15/331,323

(22) Filed: Oct. 21, 2016

(65) Prior Publication Data

US 2017/0334419 A1 Nov. 23, 2017

(30) Foreign Application Priority Data

May 20, 2016 (KR) .......................... 10-2016-0062015

(51) Int. Cl.
 *F16D 48/06* (2006.01)
(52) U.S. Cl.
 CPC ........... *F16D 48/064* (2013.01); *F16D 48/06* (2013.01); *F16D 2300/18* (2013.01); *F16D 2500/1045* (2013.01); *F16D 2500/10412* (2013.01); *F16D 2500/5046* (2013.01); *F16D 2500/7041* (2013.01)
(58) Field of Classification Search
 CPC ........ F16D 48/06; F16D 48/064; F16D 28/00; F16D 2500/106; F16D 2500/302; F16D 2500/501; B60W 10/02; B60W 10/06
 See application file for complete search history.

(56) References Cited

U.S. PATENT DOCUMENTS

| | | | | |
|---|---|---|---|---|
| 7,854,162 B2 * | 12/2010 | Panzer | ................... | F16D 21/06 73/115.04 |
| 2007/0240533 A1 * | 10/2007 | Masumoto | ............... | G05G 5/08 74/481 |
| 2013/0116088 A1 * | 5/2013 | Gibson | ................. | B60W 10/06 477/80 |

FOREIGN PATENT DOCUMENTS

| | | |
|---|---|---|
| JP | 2013-061050 | 4/2013 |
| JP | 2013-155775 A | 8/2013 |
| KR | 10-2008-0018579 A | 2/2008 |

(Continued)

OTHER PUBLICATIONS

Office Action dated Aug. 30, 2017 from corresponding Korean Application No. 10-2016-0062015, 5 pp.

(Continued)

*Primary Examiner* — Edwin A Young
(74) *Attorney, Agent, or Firm* — Brinks Gilson & Lione

(57) ABSTRACT

The present disclosure provides a control method for a vehicle with a DCT, the method including: a diagnosing step of disengaging a corresponding clutch and limiting engine torque to suppress an increase in engine RPM when a controller detects an error from a hall sensor signal, and then applying a test pulse for diagnosing the hall sensor; a reset attempting step of attempting to reset the clutch to an initial position when the controller determines that the hall sensor signal is normal after the diagnosing step; and a returning step of starting normal control of the clutch from the initial position to a target clutch stroke by means of the controller and of removing the limiting of the engine torque, when the clutch is reset to the initial position in the reset attempting step.

6 Claims, 3 Drawing Sheets

(56) References Cited

FOREIGN PATENT DOCUMENTS

| KR | 10-2010-0050710   | 5/2010 |
| KR | 10-2013-0065407 A | 6/2013 |
| KR | 10-2013-0065411 A | 6/2013 |
| KR | 10-2015-0041274 A | 4/2015 |

OTHER PUBLICATIONS

Korean Office Action dated Feb. 12, 2018 from the corresponding Korean Application No. 10-2016-0062015, 2 pp.

* cited by examiner

CONTROL METHOD FOR VEHICLE WITH DCT

CROSS REFERENCE TO RELATED APPLICATION

The present application claims priority to and the benefit of Korean Patent Application No. 10-2016-0062015, filed May 20, 2016, the entire contents of which are incorporated herein by reference.

FIELD

The present disclosure relates to a control method for a vehicle with a DCT (Dual Clutch Transmission).

BACKGROUND

The statements in this section merely provide background information related to the present disclosure and may not constitute prior art.

A DCT (Dual Clutch Transmission) includes a clutch actuator for controlling two clutches therein and a shift actuator for shifting gears so that a controller shifts gears by appropriately operating the clutch actuator and the shift actuator, depending on driving situations of a vehicle.

The clutch actuator is usually driven by a motor equipped with a hall sensor, so the position of a clutch is directly determined on the basis of a signal from the hall sensor and whether the clutch can be controlled is diagnosed on the basis of whether the signal is normal.

In the related art, when a signal having a wrong pattern or a wrong order is received from a hall sensor of a motor for a clutch actuator, a problem is sensed, and whether the motor has broken down is checked by applying a test pulse to the motor.

FIG. 1 is a graph exemplifying a case when a test pulse is applied, as described above, in which an error was sensed from a hall sensor of a motor for an even-numbered clutch actuator while a vehicle creeps backward with an even-numbered shaft clutch engaged.

In order to diagnose whether there is a malfunction when a hall sensor error is sensed, a test pulse is applied to a motor, and when it is determined that there is no malfunction, a clutch is engaged again in FIG. 1. Further, in FIG. 1, the actual stroke of an even-numbered shaft clutch going with an even-numbered shaft clutch target stroke drops from the target stroke, so a vertical vibration test is performed so the actual stroke approaches back to the target stroke.

In this situation, when the actual stroke of the clutch approaches back to the target stroke after the test is finished, we have found that a shock is generated by a sudden change of the clutch stroke and can be recognized by fluctuation of the curve showing the numbers of revolution of the even-numbered input shaft.

Obviously, a severe shock may considerably deteriorate riding comfort due to vibration of a powertrain and may even stop an engine.

The foregoing is intended merely to aid in the understanding of the background of the present disclosure, and is not intended to mean that the present disclosure falls within the purview of the related art that is already known to those skilled in the art.

SUMMARY

The present disclosure provides a control method for a vehicle with a DCT, whereby the control method improves stability of a vehicle by keeping a vehicle running, if possible, when a hall sensor error of a motor for a clutch actuator is detected, and inhibits or prevents an engine from stopping and shocking the powertrain of the vehicle by appropriately changing into a normal operation situation of a clutch after a test when it is determined that there is no malfunction in the hall sensor, thereby consequently being able to improve the commercial value of a vehicle.

In one aspect of the present disclosure, there is provided a control method for a vehicle with a DCT, the method including: a diagnosing step of disengaging a corresponding clutch and limiting engine torque to suppress an increase in engine RPM when a controller detects an error from a hall sensor signal, and then applying a test pulse to a motor being sensed by the hall sensor for diagnosing the hall sensor; a reset attempting step of attempting to reset the clutch to an initial position when the controller determines that the hall sensor signal is normal after the diagnosing step; and a returning step of starting normal control of the clutch from the initial position to a target clutch stroke by means of the controller and of removing the limiting of the engine torque, when the clutch is reset to the initial position in the reset attempting step.

The method may further include an escaping step of repeatedly attempting the reset attempting step by a predetermined number of times when the controller senses a stuck state, in which the clutch is not moved even by the reset attempting step, after the reset attempting step and before the returning step.

It may be prohibited to learn transmission torque characteristics of strokes of the clutch in the diagnosing step and the prohibition of learning may be removed in the returning step.

In the returning step, the clutch may be moved relatively quickly for approximately 70% of the entire period from the initial position to the target clutch stroke and may moved slowly in the remaining period to inhibit or prevent a shock due to reengagement of the clutch.

When the limiting of engine torque is gradually removed in the returning step as time passes.

The method may further include a malfunction responding step of stopping use of an input shaft determined as having a malfunction and changing into single-clutch driving that uses only the other input shaft, when an error of the hall sensor is decided or when the stuck state is not removed even by repeating the reset attempting step by the reference number of times in the escaping step. The malfunction responding step is performed after the diagnosing step.

According to the present disclosure, it is possible to improve stability of a vehicle by keeping a vehicle running, when a hall sensor error of a motor for a clutch actuator is detected, and inhibit or prevent an engine from stopping and shocking the powertrain of the vehicle by appropriately changing into a normal operation situation of a clutch after a test when it is determined that there is no malfunction in the hall sensor, thereby consequently being able to improve the commercial value of a vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
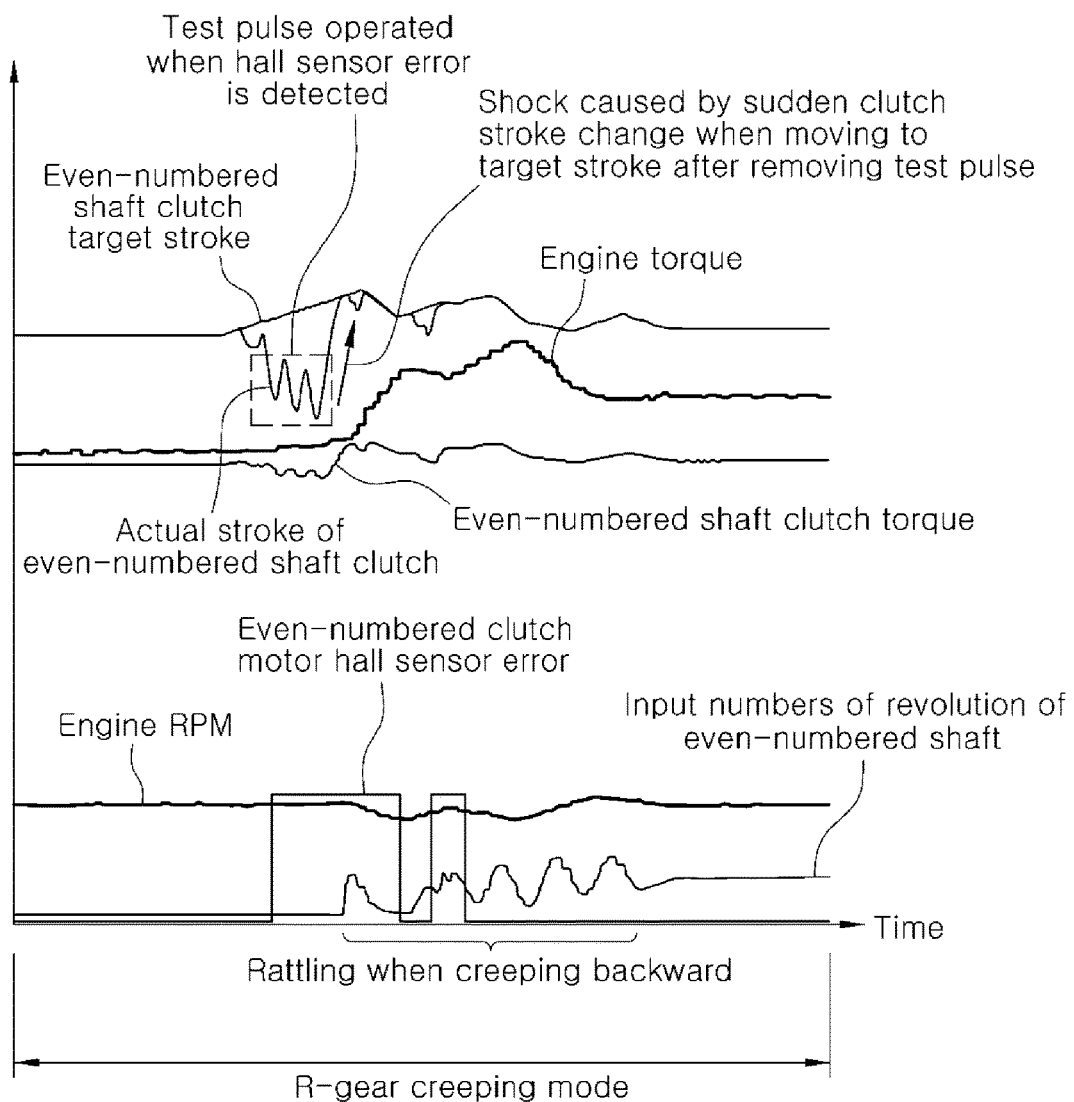
FIG. 1 is a graph exemplifying a returning situation after a test pulse is applied when a hall sensor error of a motor for a clutch actuator is generated in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
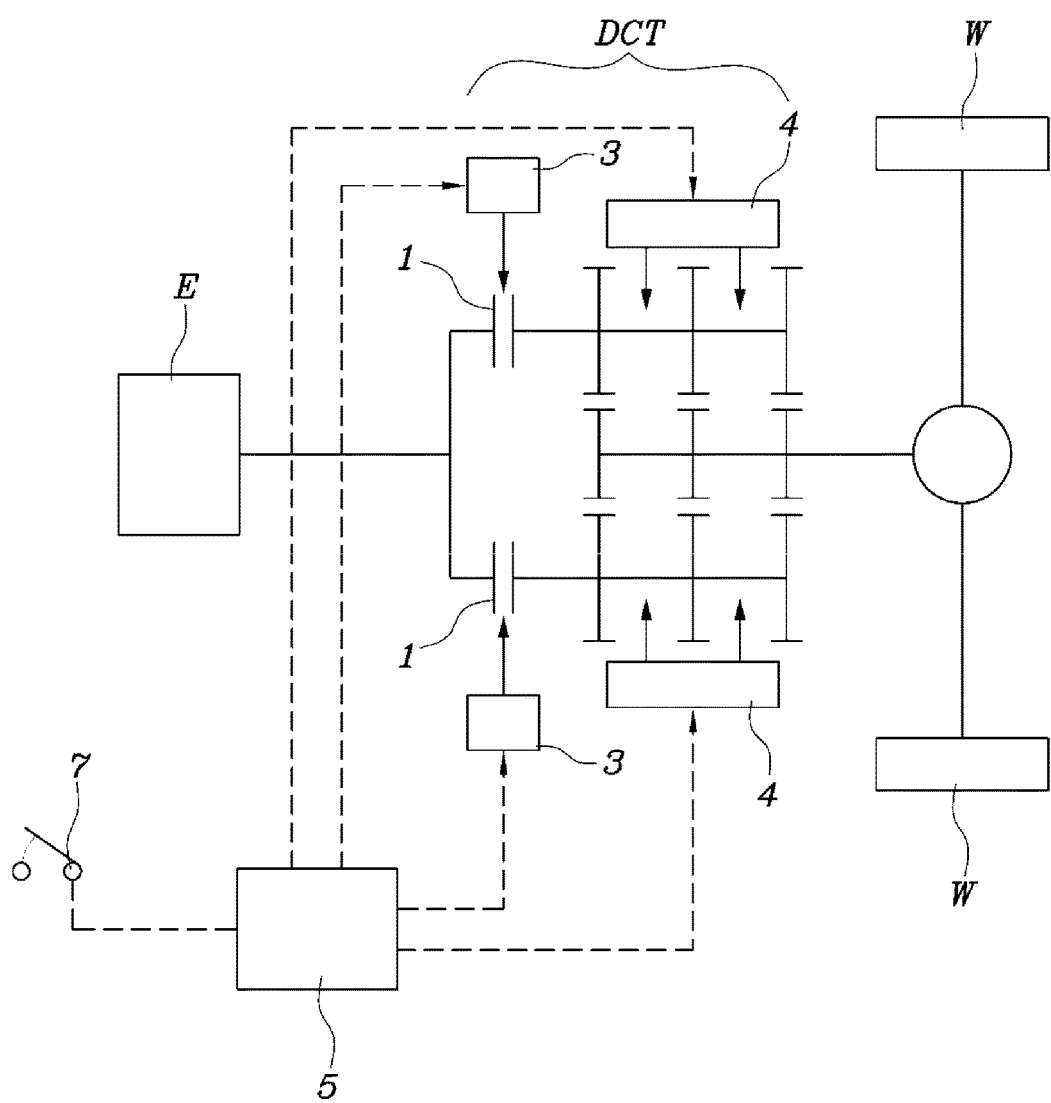
FIG. 2 is a diagram illustrating the configuration of a vehicle equipped with a DCT to which the present disclosure can be applied.

Referring to FIG. 2, power from an engine E can be supplied to driving wheels W through a DCT (Dual Clutch Transmission); two clutches of the DCT are controlled by clutch actuators 3, respectively; gears for gear stages are shifted by shift actuators 4; the clutch actuators 3 and the shift actuators 4 are controlled by a controller 5; and the controller receives signals from an APS 7 (Acceleration Position Sensor) to recognize the pressed amount of an accelerator pedal.

The controller 5 is configured to receive information such as engine torque and an engine speed from hall sensors of motors in the clutch actuators 3.

The term 'controller' refers to a transmission controller for controlling a transmission such as a DCT, unless a specific prefix is given to the term, and a controller for controlling an engine will be referred to as an 'engine controller' for distinction.

Figure 3:
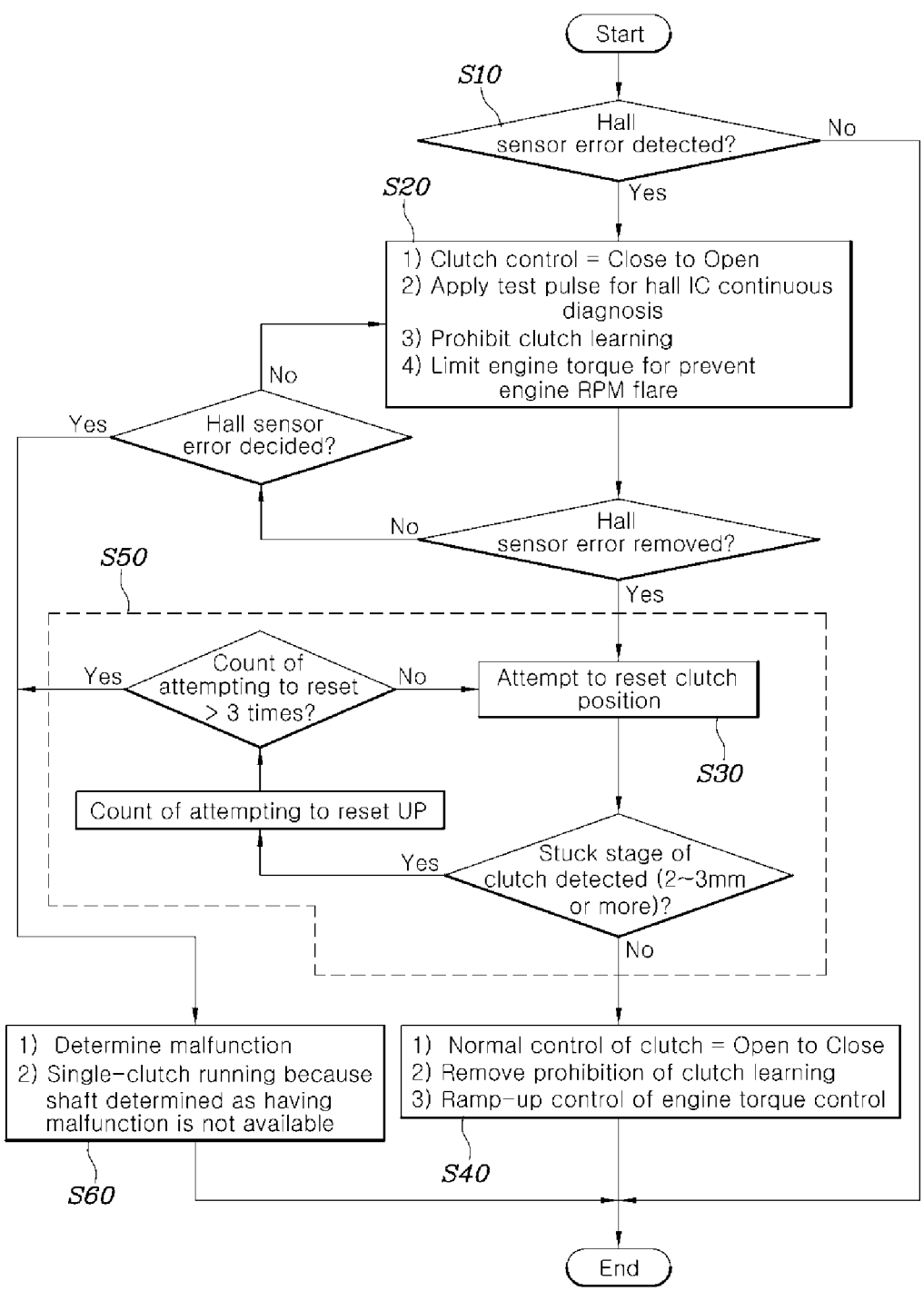
FIG. 3 is a flowchart illustrating control method of a vehicle with a DCT according to the present disclosure.

Referring to FIG. 3, one form of a control method for a vehicle with a DCT of the present disclosure includes: a diagnosing step of disengaging a corresponding clutch and limiting engine torque to suppress an increase in engine RPM when the controller 5 detects an error from a hall sensor signal, and then applying a test pulse to a motor being sensed by the hall sensor (S10); a reset attempting step of attempting to reset the clutch to the initial position when the controller 5 determines that the hall sensor signal is normal (S30) after the diagnosing step (S10); and a returning step of starting normal control of the clutch from the initial position to a target clutch stroke by means of the controller 5 and removing limiting of the engine torque (S40), when the clutch is reset to the initial position in the reset attempting step (S30).

For reference, the above mentioned corresponding clutch is a clutch controlled by a clutch actuator having a motor of which a hall sensor detected an error.

In particular, when an error of a hall sensor is detected, a malfunction of the hall sensor is decided by performing the diagnosing step (S10). However, if an error of a hall sensor is removed during a test for deciding a malfunction of the hall sensor, a corresponding clutch is reset to the initial position through the reset attempting step (S30) and then the previous state is returned through the returning step (S40) so that the vehicle can keep stably running. As such, the stability of the vehicle is improved, and changing into a normal operation situation of the clutch is appropriately made when there is no malfunction of the hall sensor.

In another form, the present method may further include an escaping step (S50) of repeatedly attempting the reset attempting step (S30) by a predetermined number of times when the controller 5 senses a stuck state, in which the clutch is not moved even by the reset attempting step (S30), after the reset attempting step (S30) and before the returning step (S40).

Accordingly, when a clutch is stuck, which may be generated in some cases, the reset attempting step (S30) is repeated several times to release the stuck clutch in order to attempt to keep the vehicle stably running, if possible.

For example, a reference number of times may be set up as three times in FIG. 3, but it may be appropriately changed in accordance with the kind or state of vehicle.

Further, it is prohibited to learn transmission torque characteristics of strokes of a corresponding clutch in the diagnosing step (S10) and the prohibition of learning is removed in the returning step (S40) in order to inhibit or prevent future side effects by inaccurate learning.

In the returning step (S40), the clutch may be moved relatively quickly for approximately 70% of the entire period from the initial position to the target clutch stroke and moved slowly in the remaining period to inhibit or prevent a shock due to reengagement of the clutch.

In particular, when the clutch reset to the initial position is moved back to the normal target clutch stroke, in order to quickly return the clutch into the normal state, the clutch is relatively quickly moved for approximately 70% of the entire period and relatively slowly moved for the remaining period to inhibit or prevent a shock due to engagement of the clutch, and thus it is possible to inhibit or prevent the problems in the related art such as stopping of an engine.

Further, when the limiting of engine torque is removed in the returning step (S40), the amount of limiting may be gradually removed as time passes. This is also for inhibiting or preventing a shock due to removal of the limiting of engine torque.

For reference, the limiting of engine torque may be controlled by the controller 5 sending a signal for requesting the engine controller to limit engine torque, and removal of the measure may also be made in cooperation with the engine controller.

If the controller 5 performs engine control, it may handle the control proposed by the present disclosure.

On the other hand, after the diagnosing step (S10), a malfunction responding step (S60) determines that there is a malfunction when an error of the hall sensor is decided or when the stuck state is not removed even by repeating the reset attempting step (S30) by the reference number of times in the escaping step (S50). In the malfunction responding step (S60), upon the determination of the malfunction of the hall sensor, use of an input shaft determined as having the malfunction is stopped, only the other input shaft is used to transfer into a single-clutch driving.

For example, when it is determined that the hall sensor of the motor of the even-numbered clutch actuator has broken down, the even-numbered shaft stops being used and the vehicle is changed into the single-clutch driving in which only the gears on the odd-numbered shaft are shifted in order to provide driving stability of the vehicle.

Although the present disclosure was described with reference to specific forms shown in the drawings, it is apparent to those skilled in the art that the present disclosure may be changed and modified in various ways without departing from the scope of the present disclosure.

What is claimed is:

1. A control method for a vehicle with a DCT, the method comprising:

a diagnosing step of disengaging a corresponding clutch and limiting an engine torque to suppress an increase in engine RPM when a controller detects an error from a hall sensor signal, and then applying a test pulse to a motor being sensed by the hall sensor;

a reset attempting step of attempting to reset the clutch to an initial position when the controller determines that the hall sensor signal is normal after the diagnosing step; and a returning step of starting normal control of the clutch from the initial position to a target clutch stroke by the controller and of removing the limiting the engine torque, when the clutch is reset to the initial position in the reset attempting step.

2. The method of claim 1, further comprising an escaping step of repeatedly attempting the reset attempting step by a predetermined number of times when the controller senses a stuck state, in which the clutch is not moved even by the reset attempting step, after the reset attempting step and before the returning step.

3. The method of claim 2, further comprising a malfunction responding step of stopping use of an input shaft determined as having a malfunction and changing into single-clutch driving that uses only an other input shaft, when an error of the hall sensor is decided or when the stuck state is not removed even by repeating the reset attempting step by the predetermined number of times in the escaping step, wherein the malfunction responding step is performed after the diagnosing step.

4. The method of claim 1, wherein the diagnosing step includes a step of prohibiting learning transmission torque characteristics of strokes of the clutch, and wherein the returning step includes removing the prohibition of learning.

5. The method of claim 1, wherein in the returning step, the clutch is moved relatively quickly for approximately 70% of an entire period from the initial position to the target clutch stroke and moved slowly in a remaining period to inhibit or prevent a shock due to reengagement of the clutch.

6. The method of claim 1, wherein the limiting of engine torque is gradually removed in the returning step as time passes.

* * * * *